US00RE40763E

(19) United States
(12) Reissued Patent
Kammerzell et al.

(10) Patent Number: US RE40,763 E
(45) Date of Reissued Patent: Jun. 23, 2009

(54) HORSE RACE STARTING GATE

(75) Inventors: Donald L. Kammerzell, Phoenix, AZ (US); Scott A. Manion, Tempe, AZ (US); Mike T. O'Connor, Wolf Point, MT (US)

(73) Assignee: K-Zell Metals, Inc., Phoenix, AZ (US)

(21) Appl. No.: 11/022,430

(22) Filed: Dec. 23, 2004

Related U.S. Patent Documents

Reissue of:
(64) Patent No.: 6,508,201
Issued: Jan. 21, 2003
Appl. No.: 09/928,652
Filed: Aug. 13, 2001

(51) Int. Cl.
*A63K 3/00* (2006.01)

(52) U.S. Cl. ..... 119/423; 119/426
(58) Field of Classification Search ..... 119/423, 119/426, 425, 400, 427; 29/469
See application file for complete search history.

(56) References Cited

U.S. PATENT DOCUMENTS

| | | | |
|---|---|---|---|
| 674,162 | A | 5/1901 | Carr |
| 2,232,675 | A | 2/1941 | Puett et al. |
| 2,273,493 | A | 2/1942 | McMillan |
| 2,808,026 | A | 10/1957 | Georgette et al. |
| 2,868,168 | A | 1/1959 | Dunn |
| 2,955,570 | A | 10/1960 | Purcell |
| 3,604,399 | A | 9/1971 | Mills |
| 3,703,883 | A | 11/1972 | Mills |
| 4,070,988 | A | 1/1978 | Smith |
| 4,102,307 | A | 7/1978 | Cusik et al. |
| 4,130,087 | A | 12/1978 | Dunn |
| 4,311,116 | A | 1/1982 | Chamberlin |
| 4,498,666 | A | 2/1985 | McCallum |
| 6,637,094 | B1 | 10/2003 | Kammerzell et al. |
| 2001/0013319 | A1 | 8/2001 | Craig |

OTHER PUBLICATIONS

Order for *True Center Leasing Inc.*v. *Sonoran Gate LLC*, No. CV–02–1109–PHX–DGC, Nov. 16, 2005.

Trial Testimony on disc for *True Center Leasing,*Inc. v. *Sonoran Gate LLC*, No. CV–02–1109–PHX–DGC, Nov. 1–2, 2005.

Pictures of gates in public use Exhibits 1, 2, 2A, 4A, 4, 5, 6, 7, 8.

Declaration of Virgil Williamson, dated Sep. 17, 2004.

Non–confidential Mediation Memorandum with Exhibits, Dec. 10, 2004.

Letter to Robert Ehman from Nelson & Roediger dated Apr. 14, 2003 with Exhibits.

Notice of Motion and Motion for Leave to File Supplemental and Amended Complaint filed May 12, 2003.

*Primary Examiner*—Yvonne R. Abbott
(74) *Attorney, Agent, or Firm*—John D. Titus

(57) ABSTRACT

A modular starting gate having a truss module, a door releasing module, a stall divider module, a front door module, a rear door module, a towing module, and a wheel assembly module. The door releasing module includes a roll-bar having articulated members that are coupled to the front door module via a coupling bar and a turnbuckle adjuster. The roll-bar is coupled to the truss module via a bearing and includes a first section coupled to a second section via a U-joint. A rebound stop is coupled to the starting gate, wherein the rebound stop has a first portion mounted to the front door module which cooperates with a second portion coupled to the stall divider module.

11 Claims, 8 Drawing Sheets

Fig. 4
(AMENDED)
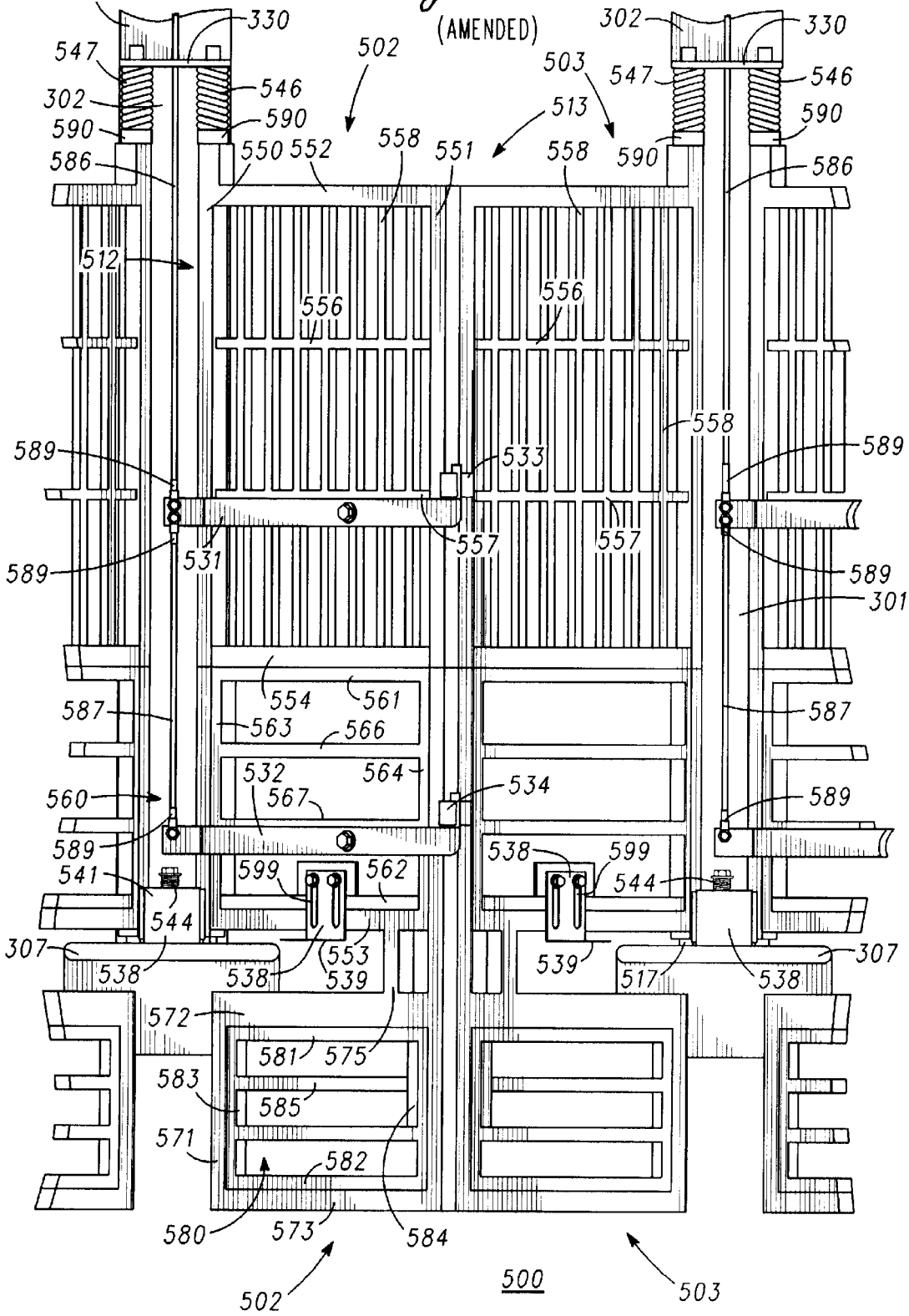

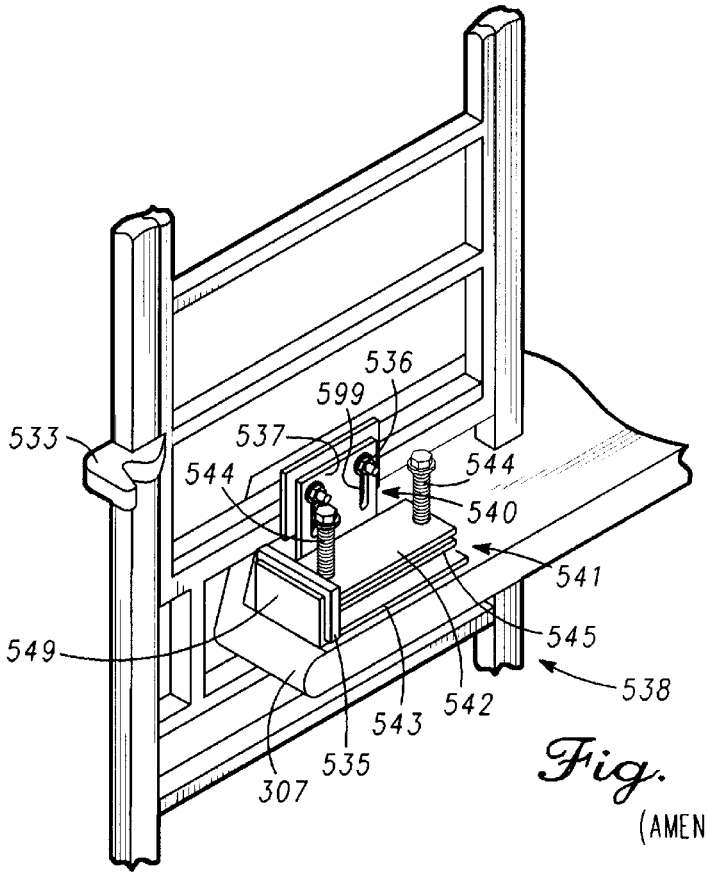
Fig. 5
(AMENDED)

HORSE RACE STARTING GATE

Matter enclosed in heavy brackets [ ] appears in the original patent but forms no part of this reissue specification; matter printed in italics indicates the additions made by reissue.

FIELD OF THE INVENTION

This invention relates, in general, to starting gates and, more particularly, to starting gates used for horse races.

BACKGROUND OF THE INVENTION

Horse races are typically run on an oval shaped track having a start line and a finish line. Prior to starting the race, a starting gate is positioned at the start line and the horses are placed in the stalls of the starting gate. The race is started by simultaneously opening the front doors of each individual stall, thereby releasing the horses so they can race around the track. The starting gate is moved away from the track immediately after the race has begun to prevent it from impeding the horses as they run around the track. Chamberlain teaches in U.S. Pat. No. 4,311,116 an in-motion starting gate having individual doors that are opened using hydraulic cylinders coupled to the individual doors. Georgette et al. teach in U.S. Pat. No. 2,808,026 opening the doors by using an electromagnet mounted to each individual door. The starting gates in these patents use many parts or components to open the individual doors. As those skilled in the art are aware, the greater the number of components, the greater the likelihood of at least one of the components failing. A common occurrence with some starting gates is gate failure where one of the front doors either fails, allowing a horse to "leak out" of the starting gate, or does not open, holding one horse in the stall. Along similar lines, one door may open more slowly than the others, either putting the horse and rider in that gate at a disadvantage or more often causing the race to be nullified. Because of the large sums of money wagered on individual races, unreliable starting gates negatively impact the profits of both the race track operators, the starting gate owners, and the horse owners.

Accordingly, what is needed is a safe, low cost, reliable starting gate.

SUMMARY OF THE INVENTION

The present invention satisfies the foregoing need by providing a cost efficient, reliable starting gate. In one aspect of the present invention, the starting gate comprises subassemblies that are manufactured to predetermined dimensions with controlled tolerances, wherein the subassemblies are interchangeable. In one embodiment the subassemblies include a truss module, a door release module coupled to the truss module, a stall divider module coupled to the truss module, a front door coupled to the stall divider module, and a rebound stop having a first portion coupled to the front door and a second portion coupled to the stall divider module, the first portion having first member for frictionally engaging the second portion. In another aspect, the staring gate comprises a horse stall having a first set of doors coupled to one end of the horse stall and a second set of doors coupled to the opposite end of the horse stall. A mechanism for opening the first set of stalls is coupled to the horse stall wherein the mechanism includes a roll-bar coupled to the horse stall via a plurality of bearings. The roll-bar has a first section coupled to a second section by a U-joint, wherein said roll-bar spans at most two bearings without a U-joint, a means for rotating the roll-bar coupled to the horse stall, an articulated member extending from the roll-bar; and a coupling bar coupled to the articulated member.

BRIEF DESCRIPTION OF THE DRAWING

The present invention will be better understood from a reading of the following detailed description, taken in conjunction with the accompanying drawing figures in which like references designate like elements and in which:

FIG. 4 is a front view of a front door module of the starting gate of FIG. 1;

FIG. 5 is an isometric view of a rebound stop in accordance with an embodiment of the present invention;

DETAILED DESCRIPTION

Properly operating starting gates are critical to the success of each horse race. In accordance with the present invention, a starting gate is provided that is modular, reliable, safe, and cost efficient. Because the starting gate is modular, it offers savings in both its cost of manufacture and the time needed for its manufacture. Further, the modularity increases the tolerance control which results in an improvement in reliability of the starting gate and permits interchangeability of parts.

Figure 1:
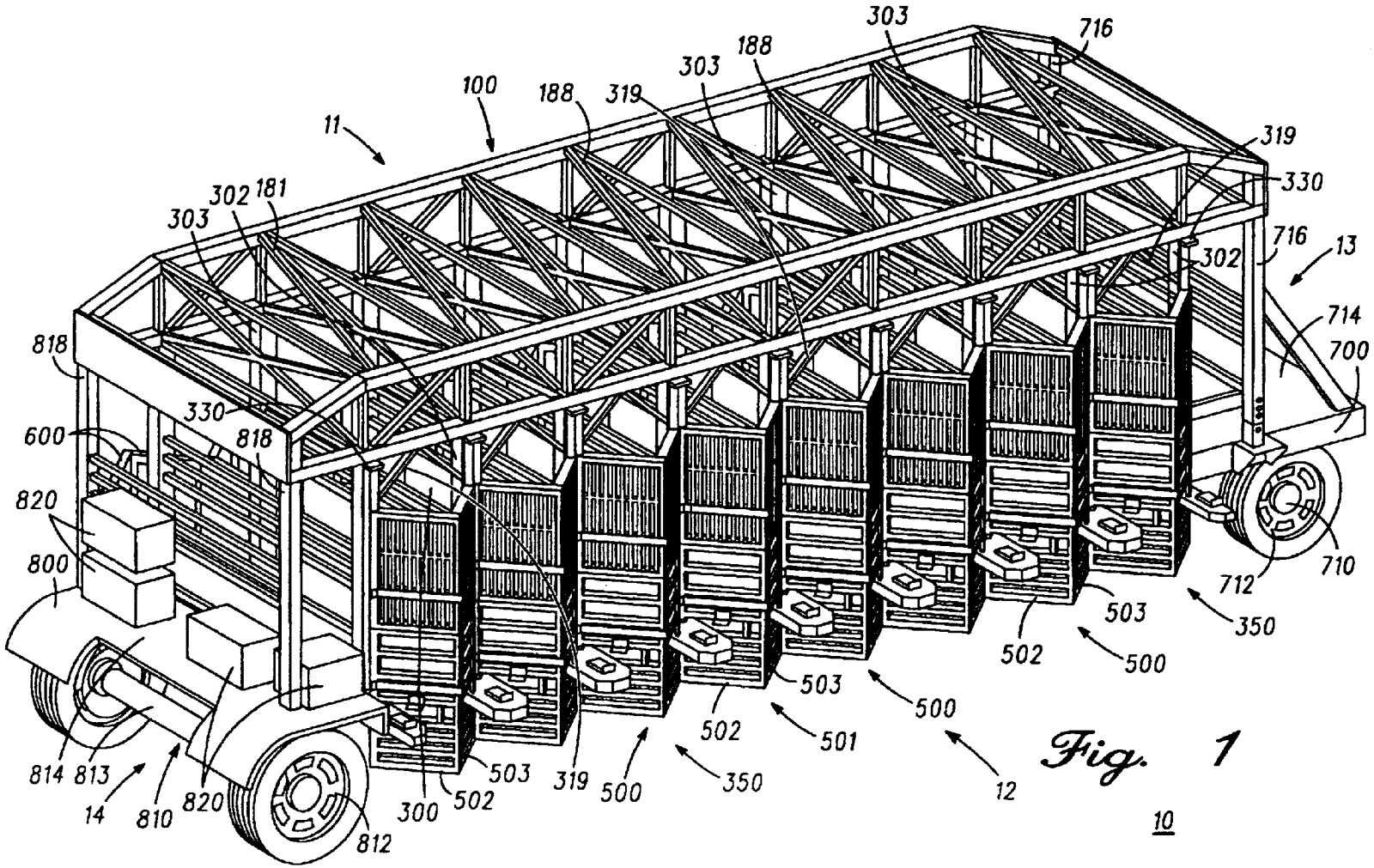
FIG. 1 is an isometric view of a starting gate in accordance with an embodiment of the present invention.

FIG. 1 is an isometric view of a starting gate 10 having a horse entering side 11, a horse exiting side 12, a front end 13, a rear end 14, and which is manufactured in accordance with an embodiment of the present invention. Starting gate 10 is manufactured in a modular fashion and comprises a truss module 100, a door release module 200 (not shown in FIG. 1), a stall divider module 300, a front door module 500, a rear door module 600, a front transport module 700, and a rear transport module 800. Door release module 200 has been omitted from FIG. 1 to make the figure easier to understand, but is shown and described with reference to FIGS. 8–10.

Figure 2:
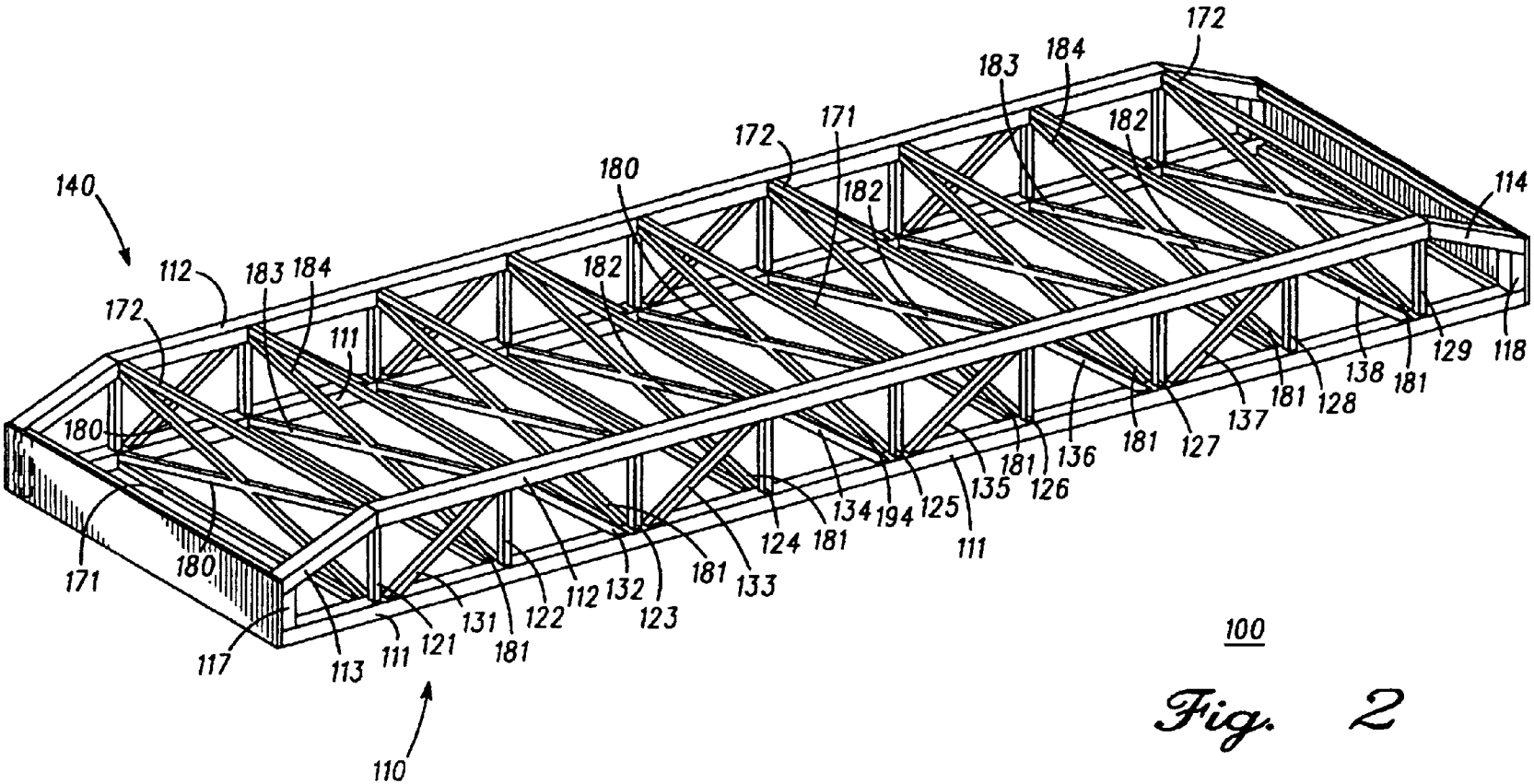
FIG. 2 is an isometric view of a truss module of the starting gate of FIG. 1.

Referring now to FIG. 2, an isometric view of truss module 100 in accordance with the first embodiment is shown. Truss module 100 is an overhead support structure that comprises a pair of trusses 110 and 140 coupled together by a plurality of horizontal coupling braces 171 and 172 and a plurality of X-shaped cross-braces 180. Trusses 110 and 140 include a lower rail 111, an upper rail 112, angled rails 113 and 114, end braces 117 and 118, interior vertical braces 121–129, and interior diagonal braces 131–138. Although trusses 110 and 140 are preferably identical, they have been assigned different reference numbers to aid in describing truss module 100. However, the same reference numbers have been used to identify the components of trusses 110 and 140. Preferably upper rail 112 is shorter than lower rail 111. Trusses 110 and 140 are configured such that for each truss, upper rail 112 is parallel to lower rail 111 and upper rail 112 is centered within the length of lower rail 111. Interior vertical braces 121–129 have first and second ends, wherein the first ends of interior vertical braces 121–129 are welded to lower rail 111 and the second ends of interior vertical braces 121–129 are welded to upper rail 112. Preferably, interior vertical braces 121–129 have the same length, are parallel to each other, and are perpendicular to rails 111 and 112. It is also preferable that interior vertical braces 121–129 be positioned such that the distance between any two adjacent interior vertical braces be the same as the distance between any other two adjacent interior vertical braces.

The first end of interior vertical brace 121 is welded to lower rail 111 such that it is proximal to, but spaced apart from, the first end of lower rail 111. The second end of interior vertical brace 121 is welded to the first end of upper rail 112. The first end of interior vertical brace 129 is welded to lower rail 111 such that it is proximal to, but spaced apart from, the second end of lower rail 111. The second end of interior vertical brace 129 is welded to the second end of upper rail 112. Brace 125 is welded to the centers of rails 111 and 112. Interior vertical braces 122, 123, and 124 are welded to the portions of rails 111 and 112 between vertical braces 121 and 125, and interior vertical brace 126, 127, and 128 are welded to the portions of rails 111 and 112 between vertical braces 125 and 129.

End braces 117 and 118 are welded to the first and second ends, respectively, of lower rail 111 and are substantially parallel to each other. In accordance with this embodiment, end braces 117 and 118 are shorter than interior vertical braces 121–129. One end of angled rail 113 is welded to the end of upper rail 112 that is adjacent to brace 121 and the other end of angled rail 113 is welded to end brace 117. One end of angled rail 114 is welded to the end of upper rail 112 that is adjacent to brace 129 and the other end of angled rail 114 is welded to end brace 118. It should be understood that end braces 117 and 118 are optional features. Thus, in an alternative embodiment, one end of angled rail 113 is welded to the end of upper rail 112 that is adjacent to brace 121 and the other end of angled rail 113 is welded to lower rail 111. Likewise, one end of angled rail 114 is welded to the end of upper rail 112 that is adjacent to brace 129 and the other end of angled rail 114 is welded to lower rail 111. Alternatively, rails 111 and 112 can be the same length, wherein angled rails 113 and 114 are not used and end braces 118 are welded to the ends of rails 111 and 112.

Interior diagonal braces 131–138 are welded between rails 111 and 112. In particular, the first end of interior diagonal brace 131 is welded to the portion of lower rail 111 adjacent interior vertical brace 121 and the first end of interior diagonal brace 132 is welded to the portion of lower rail 111 adjacent a first side of interior vertical brace 123. The second ends of interior diagonal braces 131 and 132 are welded to the portions of upper rail 112 adjacent interior vertical brace 122, wherein the second ends are welded on opposite sides of interior vertical brace 122. Thus, diagonal braces 131 and 132, rail 111, and interior vertical brace 122 form a triangular shaped structure comprising two right triangles sharing a common side.

The first end of interior diagonal brace 133 is welded to the portion of lower rail 111 adjacent a second side of interior vertical brace 123 and the first end of interior diagonal brace 134 is welded to the portion of lower rail 111 adjacent a first side of interior vertical brace 125. The second ends of interior diagonal braces 133 and 134 are welded to the portions of upper rail 112 adjacent interior vertical brace 124, wherein the second ends are welded on opposite sides of interior vertical brace 124. Diagonal braces 133 and 134, rails 111, and interior vertical brace 124 form a triangular shaped structure comprising two right triangles sharing a common side.

The first end of interior diagonal brace 135 is welded to the portion of lower rail 111 adjacent a second side of interior vertical brace 125 and the first end of interior diagonal brace 136 is welded to the portion of lower rail 111 adjacent a first side of interior vertical brace 127. The second ends of interior diagonal braces 135 and 136 are welded to the portions of upper rail 112 adjacent interior vertical brace 126, wherein the second ends are welded on opposite sides of interior vertical brace 126. Diagonal braces 135 and 136, rail 111, and interior vertical brace 126 form a triangular shaped structure comprising two right triangles sharing a common side.

The first end of interior diagonal brace 137 is welded to the portion of lower rail 111 adjacent a second side of interior vertical brace 127 and the first end of interior diagonal brace 138 is welded to the portion of lower rail 111 adjacent to first side of vertical brace 129. The second ends of interior diagonal braces 137 and 138 are welded to the portions of upper rail 112 adjacent interior vertical brace 128, wherein the second ends are welded on opposite sides of interior vertical brace 128. Diagonal braces 137 and 138, rail 111, and interior vertical brace 128 form a triangular shaped structure comprising two right triangles sharing a common side.

Trusses 110 and 140 are coupled together using horizontal coupling braces and X-shaped cross-braces to form truss module 100. Horizontal coupling braces 171 are welded between lower rails 111 of trusses 110 and 140 and a plurality of horizontal coupling braces 172 are welded between upper rails 112 of trusses 110 and 140. More particularly, truss 110 is aligned in a spaced apart parallel relationship with truss 140 and one end of each horizontal coupling brace 171 is welded to lower rail 111 of truss 110 and each other end is welded to lower rail 111 of truss 140. Preferably, a horizontal coupling brace 171 is associated with each set of interior vertical braces 121–129, where a horizontal coupling brace 171 is welded to lower rails 111 at each location adjacent a corresponding interior vertical brace 121–129. Thus, a horizontal coupling brace 171 is welded between horizontal rail 111 of truss 110 and horizontal rail 111 of truss 140 at locations adjacent interior vertical braces 121, a horizontal coupling brace 171 is welded between horizontal rail 111 of truss 110 and horizontal rail 111 of truss 140 at locations adjacent interior vertical braces 122, a horizontal coupling brace 171 is welded between horizontal rail 111 of truss 110 and horizontal rail 111 of truss 140 at locations adjacent interior vertical braces 123, etc.

Likewise, a separate horizontal coupling brace 172 is welded between upper rails 112 adjacent each location having an interior vertical brace 121–129. Thus, a horizontal coupling brace 172 is welded between upper rail 112 of truss 110 and upper rail 112 of truss 140 at locations adjacent interior vertical braces 121, a horizontal coupling brace 172 is welded between upper rail 112 of truss 110 and upper rail 112 of truss 140 at locations adjacent interior vertical braces 122, a horizontal coupling brace 172 is welded between upper rail 112 of truss 110 and upper rail 112 of truss 140 at locations adjacent interior vertical braces 123, etc. Horizontal coupling braces 171 and 172 are substantially parallel to each other and substantially perpendicular to trusses 110 and 140.

Trusses 110 and 140 are further coupled to each other by a plurality of X-shaped cross-braces 180. Each X-shaped cross-brace has four legs 181, 182, 183, and 184, wherein legs 181 and 182 are welded to lower rail 11 and upper rail 112, respectively, of truss 110, and legs 183 and 184 are welded to lower rail 111 and upper rail 112, respectively, of truss 140. Preferably, an X-shaped cross-brace 180 is positioned to be between interior vertical braces 121 of trusses 110 and 140, an X-shaped cross-brace 180 is positioned to be between interior vertical braces 122 of trusses 11 0 and 140, an X-shaped cross-brace 180 is positioned to be between interior vertical braces 123 of trusses 110 and 140, etc. Thus, legs 181 and 182 of one X-shaped cross-brace are welded to portions of rails 111 and 112, respectively, that are adjacent interior vertical brace 121 of truss 110, and legs 183 and 184 are welded to portions of rails 111 and 112, respectively, that are adjacent interior vertical brace 121 of truss 140. Likewise, legs 181 and 182 of another X-shaped cross-brace 180 are welded to portions of rials 111 and 112, respectively, that are adjacent interior vertical brace 122 of truss 110, and legs 183 and 184 are welded to a portion of rails 111 and 112, respectively, that are adjacent interior vertical brace 122 of truss 140. Preferably, there is an X-shaped cross-brace between each corresponding interior vertical brace 121–129 of trusses 110 and 140 and, thus, between corresponding coupling braces 171 and 172.

In accordance with the present invention, the dimensions of truss module 100 are maintained within very tight tolerances, e.g., the lengths and widths of trusses 110 and 140 and their individual components as well as braces 171 and 172 and X-shaped braces 180 are maintained within very tight tolerances.

Although not shown in FIGS. 1 and 2 for the sake of clarity, truss module 100 may include laterally positioned diagonal cross-braces coupling trusses 110 and 140 between braces 172 and running in the same plane as rails 112 and braces 172. It should be understood the particular configuration of the truss structure is not a limitation of the present invention. For example, other embodiments of the starting gate may utilize different truss designs that provide the same rigid load carrying capability.

It should be noted that when stall door release module 200, stall divider module 300, front door module 500, and rear door module 600 are mounted to truss module 100, trusses 110 and 140 may sag. Thus, it may be desirable to manufacture trusses 110 and 140 with a camber or bow to compensate for the sag so that trusses 110 and 140 become straight when starting gate 10 is complete.

Figure 3:
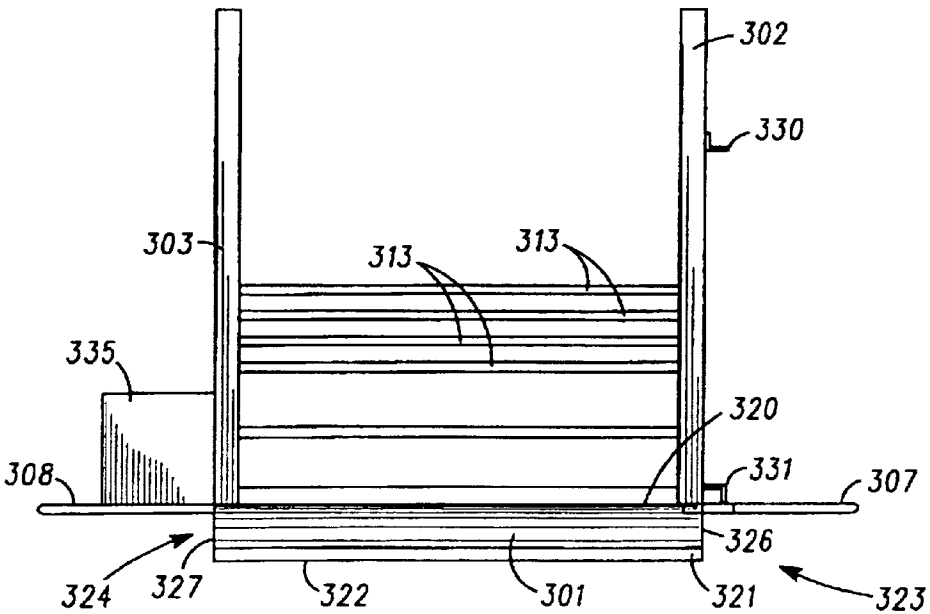
FIG. 3 is a side view of a stall divider module in accordance with an embodiment of the present invention.

Now referring to FIG. 3, a side view of divider means or a stall divider module 300 in accordance with an embodiment of the present invention is shown. Stall divider module 300 comprises a platform 310, a front support column 302, a back support column 303, a caboose 335, a front fender 307, a rear fender 308, and a plurality of lengthwise braces 313. Platform 301 is shaped like a pontoon having a flat top surface 320, beveled side surfaces 321, a flat bottom surface 322, a front or head end 323, and a back or tail end 324. Preferably platform 301 is formed from a stainless steel sheet in a press brake. Briefly referring to FIG. 1, diagonal stiffening braces 319 are located near the tops of each column 302, wherein one diagonal stiffening brace is welded to one side of column 302 and to horizontal rail 111 and a second diagonal stiffening brace is welded to an adjacent column 302 and to horizontal rail 111, thereby forming an L-shaped structure. A front support column 302 is adjacent a front side 326 and extends through platform 301 to bottom surface 322. Front support column 302 is welded to the bottom side of top surface 320 and to bottom surface 322. A back support column 303 is adjacent to back side 327 and extends through platform 301. Back support column 303 is welded to the bottom side of top surface 320 and to bottom surface 322. Front fender 307 extends from front side 326 and is preferably coplanar with top surface 320. Lengthwise braces 313 are welded between front and back support columns 302 and 303, respectively. Braces 313 are vertically spaced apart from each other. Alternatively, braces 313 can be welded to columns 302 and 303 such that they are angled to extend from a high point near the front of the stall to a low point near the rear of the stall. Hinges 330 and 331 are welded to front support column 302.

In accordance with the present invention, the dimensions of stall divider module 300 are maintained within very tight tolerances, i.e., the lengths and widths of platform 301, front support column 302, back support column 303, caboose 335, front fender 307, rear fender 308, hinges 330 and 331, the plurality of lengthwise braces 313, and the locations of hinges 330 and 331 are maintained within tight tolerances.

Briefly referring to FIG. 1, a front door module 500 is shown mounted to each front support column 302. Front door module 500 comprises a set of front doors 502 and 503, where front doors 502 and 503 are torsionally and removably mounted to front support columns 302. When front doors 502 and 503 are in a closed configuration, they form a V-shaped structure. Now referring to FIG. 4, a front view of front doors 502 and 503 is shown. FIG. 4 is drawn to include this V-shaped aspect when front doors 502 and 503 are in the closed configuration. Front door 502 is comprised of a pair of vertical rails 550 and 551 that are spaced apart from and substantially parallel to each other. Vertical rail 551 is longer than vertical rail 550. The first end of a horizontal rail 552 is welded near a first end of vertical rail 550 and the second end of horizontal rail 552 is welded to the second end of vertical rail 551. Horizontal rail 552 is substantially perpendicular to vertical rails 550 and 551. The first end of a horizontal rail 553 is welded near the second end of vertical rail 550 and the second end of horizontal rail 553 is welded to a first mid-portion of vertical rail 551. The first end of a horizontal brace 554 is welded to a first mid-portion of vertical rail 550 and the second end of horizontal brace 554 is welded to a second mid-portion of vertical rail 551 such that horizontal brace 554 is between horizontal rails 552 and 553. A pair of horizontal braces 556 and 557 are welded to portions of vertical rails 550 and 551 between horizontal rail 552 and horizontal brace 554. Horizontal braces 556 and 557 are space apart from and substantially parallel to each other and substantially parallel to horizontal rails 552 and 554. A plurality of spaced apart vertical braces 558 are welded between horizontal rails 552 and 553. Vertical braces 558 are substantially parallel to each other and to vertical rails 550 and 551.

A quadrilateral frame 560 having a top side 561, a bottom side 562, a mounting side 563, and a latching side 564 is welded between vertical supports 550 and 551 in the region between horizontal brace 554 and horizontal rail 553. Frame 560 is welded or tacked in position such that top side 561 abuts horizontal brace 554, bottom side 562 abuts horizontal rail 553, mounting side 563 abuts vertical support 550, and latching side 564 abuts vertical support 551. Further, a pair of spaced apart horizontally oriented braces 566 and 567 are welded between mounting and latching sides 563 and 564, respectively.

A first end of a vertical rail 571 is welded to a first end of a horizontal rail 572 and the second end of vertical rail 571 is welded to a first end of a horizontal rail 573. The second end of horizontal rail 572 is welded to a third mid-portion of vertical rail 551 and the second end of horizontal rail 573 is welded to the second end of vertical rail 551. Vertical rail 571 is positioned to be substantially parallel to vertical rails 550 and 551 and substantially perpendicular to horizontal rails 572 and 573. A vertical brace 575 is welded between horizontal rails 553 and 572 and is spaced apart from but proximal to vertical rail 551. It should be noted that horizontal rails 553 and 572 and vertical brace 575 cooperate to form a C-shaped or "sideways" U-shaped structure which allows door 502 to rotate over front fender 307 without touching it.

A quadrilateral frame 580 having a top side 581, a bottom side 582, a mounting side 583, and a latching side 584 is welded between vertical rails 551 and 571 in the region between horizontal rail 572 and horizontal rail 573. Frame 580 is welded or tacked in position such that top side 581 abuts horizontal rail 572, bottom side 582 is spaced apart from horizontal rail 573, mounting side 583 abuts vertical support 571, and latching side 584 abuts vertical support 551. Further, a horizontally oriented brace 585 is welded between mounting and latching sides 583 and 584, respectively.

A pivot bar or latch arm 531 is pivotally mounted to horizontal brace 557 and a pivot bar or latch arm 532 is pivotally mounted to horizontal brace 567. Pivot bars 531 and 532 have a hooked end and a coupling end. The hooked ends each pivot bar have a hook that is designed to mate with latches on door 503. The coupling end of pivot bar 531 has two holes wherein one hole is for coupling with a gating arm, e.g., one of gating arms 211 shown in FIG. 8, via a coupling bar 586 and the other hole is for coupling to pivot bar 532. The coupling end of pivot bar 532 also has a hole for coupling with pivot bar 531 via coupling bar 587. By way of example, hook 533 is welded to the portion of vertical rail 551 of door 503 adjacent to horizontal rail 557 and hook 534 is welded to the portion of vertical rail 551 of door 503. It should be understood that the coupling ends of pivot bars 531 and 532 may be angled to further aid in opening door 502. Preferably, turnbuckle adjusters 589 are attached to the end of coupling bar coupled to pivot bar 531 and to both ends of coupling bar 587. Turnbuckle adjusters 589 can be adjusted so that the same angular rotation of roll-bar 210 (FIGS. 8–10) disengages pivot bars 531 and 532 from hooks 533 and 534, thereby assuring that all of the front doors open simultaneously.

Front door 503 is similar in construction to front door 502 and is therefore comprised of vertical rails 550, 551, 571, and 572; horizontal rails 552, 553, 554, and 573; horizontal braces 554, 556, and 557; vertical braces 558 and 575; quadrilateral frames 560 and 580; rebound stops 538 (described hereinafter); and torsion springs 546 and 547. It should be noted that horizontal rails 553 and 572 and vertical brace 575 cooperate to form a C-shaped or "sideways" U-shaped structure which allows door 503 to rotate over fender 307 without touching it.

It should be understood that pivot bars are not mounted to front door 503. Rather, latches 533 and 534 are mounted to vertical rail 551 of front door 503 wherein latches 533 and 534 are designed to cooperate with the respective hooks on pivot arms 531 and 532 to hold doors 502 and 503 closed. It should be further understood that to simplify the description, only a single set of front doors is described; however, the description applies to each set of front doors of starting gate 10. Although front doors 502 and 503 have been described as having two sets of pivot bars and hooks, this is not a limitation of the present invention. For example, there can be one pivot bar and hook or more than two sets of pivot bars and hooks. Pivot bars and hooks are also referred to as gating arms and latches, respectively.

Similar to truss module 100 and stall divider module 300, the dimensions of each component of front door module 500 are held to within very tight tolerances.

Still referring to FIG. 4, torsion springs 546 and 547 are mounted to the ends of vertical rails 550. The tops of torsion springs 546 and 547 are coupled to upper hinge plates 330 that are fastened to front support column 302. The bottoms of torsion springs 546 and 547 are coupled to the ends of vertical rails 550 and 551, respectively, via an adjustable collar 590. It should be understood that torsion springs 546 and 547 have rotational moments and they are mounted to vertical rail 551 to apply a force on door 502 to move it to be in the open position. In other words, spring 546 rotates door 502 in the opposite direction that spring 547 rotates door 503. Torsion springs 546 and 547 are calibrated to apply the same torque to each door, thereby assuring that when doors 502 and 503 are released at the same time, they open at the same speed.

Rebound stops 538 for front doors 502 and 503 are mounted to the front doors and to the front fenders. Briefly referring to FIG. 5, an isometric view of a rebound stop 538 is shown. Rebounds stops 538 are comprised of a first or male portion 540 and a second or female portion 541. Male portion 540 is mounted to bottom side 562 (shown in FIG. 4) of quadrilateral frame 560 of door 502 and female portion 541 is mounted to front fender 307. By way of example, male portion 540 is an L-shaped bracket having a vertical section 537 mounted to doors 502 and 503 and a horizontal section 539 (see FIG. 4) that has a knife edge, wherein horizontal section 539 is substantially perpendicular to the direction of gravity. Male portion 540 can be adjusted in the vertical direction using bolts 536 that are inserted into slots [(not shown)] *599* that are in male portion 540. Female portion 541 is comprised of a plate 542 adjustably coupled or mounted to a coupling plate 543 by a set of spring loaded bolts 544. Coupling plate 543 has a front angle plate 549. The distance between adjustable plate 542 and coupling plate 543 can be adjusted by placing one or more additional spacers 545 on coupling plate 543. A rubber pad 535 is mounted to front angle plate 549. Rubber pad 535 dampens the impact of the opening door and quiets the door from ringing. The amount of friction on the brake can be adjusted using the spring loaded bolts 544. When front doors 502 and 503 open, knife edge portion 539 of male portion 540 frictionally slides between adjustable plate 542 and coupling plate 543 (or, if present, the additional spacer 545) to prevent front doors 502 and 503 from bouncing back into the horse and rider as they leave the stall at the start of a race. Hence, rebound stop 538 is also referred to as a friction stop. An advantage of configuring rebound stops to be like rebound stop 538 is that each one can be individually adjusted quickly and easily using slots (not shown) and bolts 536 and spring loaded bolts 544. Making the rebound stop adjustable allows the front doors to be easily replaceable in the event one or both of the doors becomes damaged.

Figure 6:
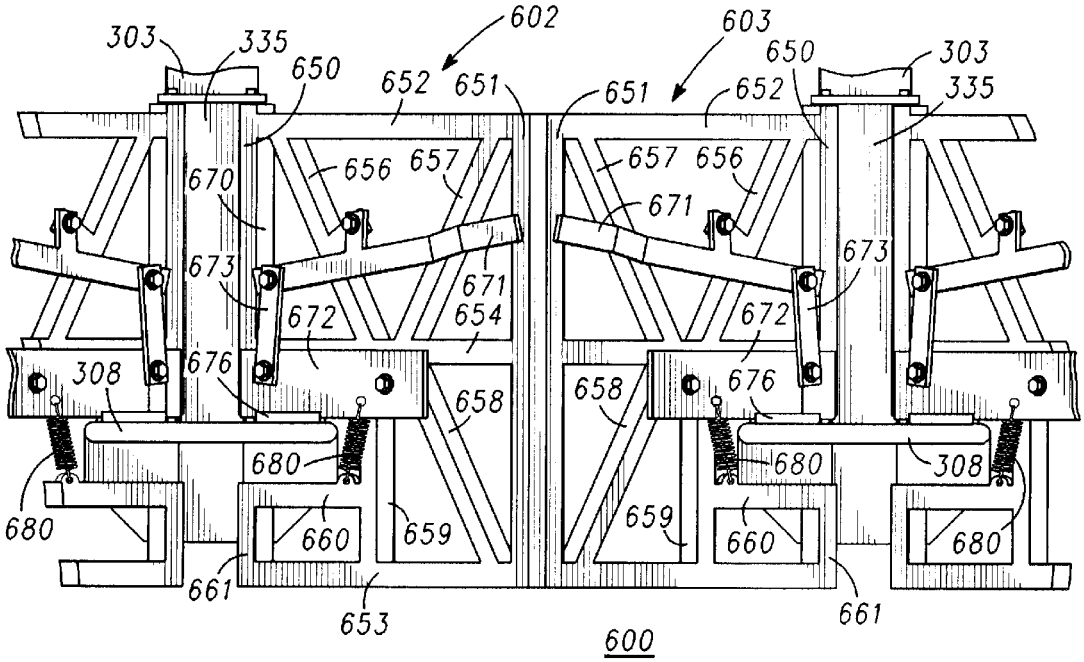
FIG. 6 is a plan view of the back door module in accordance with an embodiment of the present invention.

Referring to FIG. 6, a plan view of a back door module 600 having back doors 602 and 603 removably mounted to cabooses 335 in accordance with an embodiment of the present invention is shown. Similar to front doors 502 and 503, when back doors 602 and 603 are in a closed configuration they form a V-shaped structure. FIG. 6 is drawn to include this V-shaped aspect when back doors 602 and 603 are in the closed configuration. What is shown in FIG. 6 are back doors 602 and 603, back support columns 303, cabooses 335, and rear fenders 308. Back door module 600 is built in a modular fashion, i.e., each door is built prior to mounting to back support columns 303. Back support columns 303 are shown in FIG. 6 for the sake of clarity. In other words, back support columns 303 are not part of back door module 600. Back door 602 is comprised of a pair of substantially vertical rails 650 and 651 that are spaced apart from and substantially parallel to each other, wherein rail 650 is shorter than rail 651. Back door 602 further includes a pair of substantially equal length horizontal rails 652 and 653 that are spaced apart from and substantially parallel to each other. The first end of horizontal rail 652 is welded to the first end of vertical rail 650 and the second end of horizontal rail 652 is welded near the first end of vertical rail 651. Horizontal rail 652 is substantially perpendicular to vertical rails 650 and 651. The first end of horizontal rail 653 is welded to the first end of vertical rail 661 and the second end of horizontal rail 653 is welded to the second end of vertical rail 651. The first end of a horizontal brace 654 is welded to an end of vertical rail 650 and the second end of horizontal brace 654 is welded to a mid-portion of vertical rail 651. The first end of a diagonal brace 656 is welded near the first end of horizontal rail 652 and the second end of diagonal brace 656 is welded near a central portion of horizontal brace 654. The first end of a diagonal brace 657 is welded near the second end of horizontal rail 652 and the second end of diagonal brace 657 is welded near the central portion of horizontal brace 654. The first end of a diagonal brace 658 is welded near the second end of horizontal rail 653 and the second end of diagonal brace 658 is welded to a central portion of horizontal brace 654. The first end of a vertical brace 659 is welded near the central portion of horizontal brace 654 and the second end of vertical brace 659 is welded near the central portion of horizontal rail 653. The first end of a horizontal brace 660 is welded to second end of vertical rail 661 and the second end of horizontal brace 660 is welded to vertical brace 659. It should be noted that horizontal rail 660, horizontal brace 654, and vertical brace 659 cooperate to form a C-shaped or "sideways" U-shaped structure which allows doors 602 and 603 to rotate over rear fender 308 without touching it. An advantage of this structure is that it allows removal of doors 602 and 603 without cutting rear fender 308.

Figure 7:
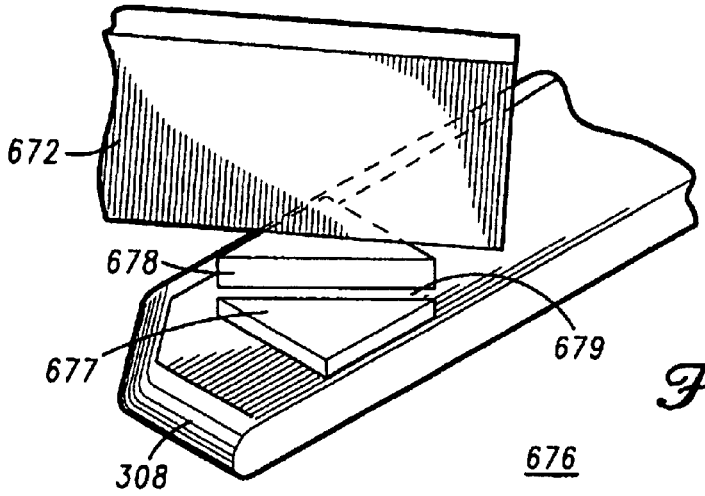
FIG. 7 is an isometric view of a door locking mechanism of the back door module of FIG. 6.

Back door structure 600 includes a door latching mechanism 670 that comprises a lever 671 coupled to a locking plate 672 via a coupling bar 673. Although coupling bar 673 is shown as a piece of metal, this is not a limitation of the present invention. For example, coupling bar 673 can be comprised of several lengths of chain to apply an up-pressure. Lever 671 has a handle end, a coupling end, and a centrally located fastening portion. The fastening portion is for pivotally fastening lever 671 to diagonal brace 656 and the coupling end is for pivotally coupling the coupling end to a first end of coupling bar 673. The handle end is for latching and unlatching the door, i.e., moving the handle in the upward direction latches the door and moving the handle in the downward direction unlatches the door. Locking plate 672 is a rectangularly shaped plate having one side pivotally mounted to diagonal brace 658 and an opposite side pivotally mounted to the second end of coupling bar 673. Locking plate 672 cooperates with a plate locking mechanism 676 to latch doors 602 and 603. Briefly referring to FIG. 7, plate locking mechanism 676 is preferably comprised of two triangularly shaped metal plates 677 and 678 welded to rear fender 308. The hypotenuses of metal plates 677 and 678 are sufficiently spaced apart to allow the locking plate 672 to fit into a groove or slot 679 that is between metal plates 677 and 678. In operation, lever 671 lifts locking plate 672 from groove 679 and the doors 602 and 603 are rotated open. Locking plate 672 cannot fall into groove 679 because it rides over metal plate 677. Doors 602 and 603 are rotated back into the closed position and locking plate 672 is pulled down into groove 679 by a spring 680 (FIG. 6) coupled between locking plate 672 and horizontal brace 660. Thus, metal plate 678 functions as a stop or brake when lever 671 is actuated.

Similar to truss module 100, stall divider module 300, and front door module 500, the dimensions of each component of back door module 600 are held to within very tight tolerances. It should be appreciated that front and back door modules serve as gating means for starting gate 10.

Figure 8:
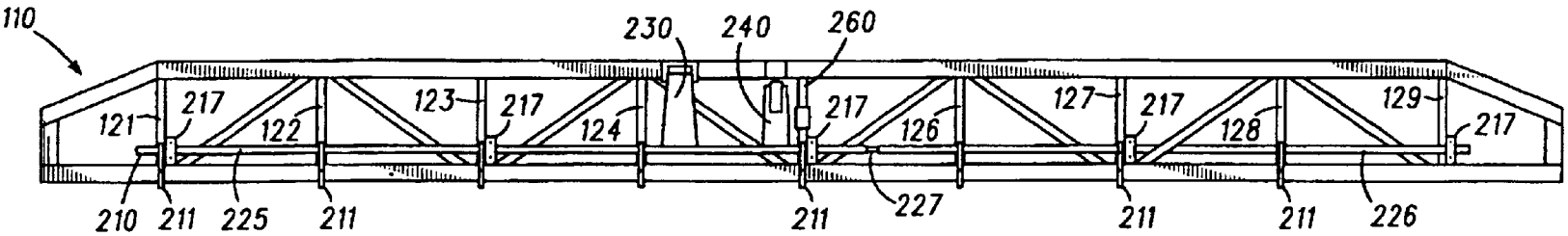
FIG. 8 is a plan view of a truss module having a roll-bar portion of the door release module of FIG. 1.
Figure 9:
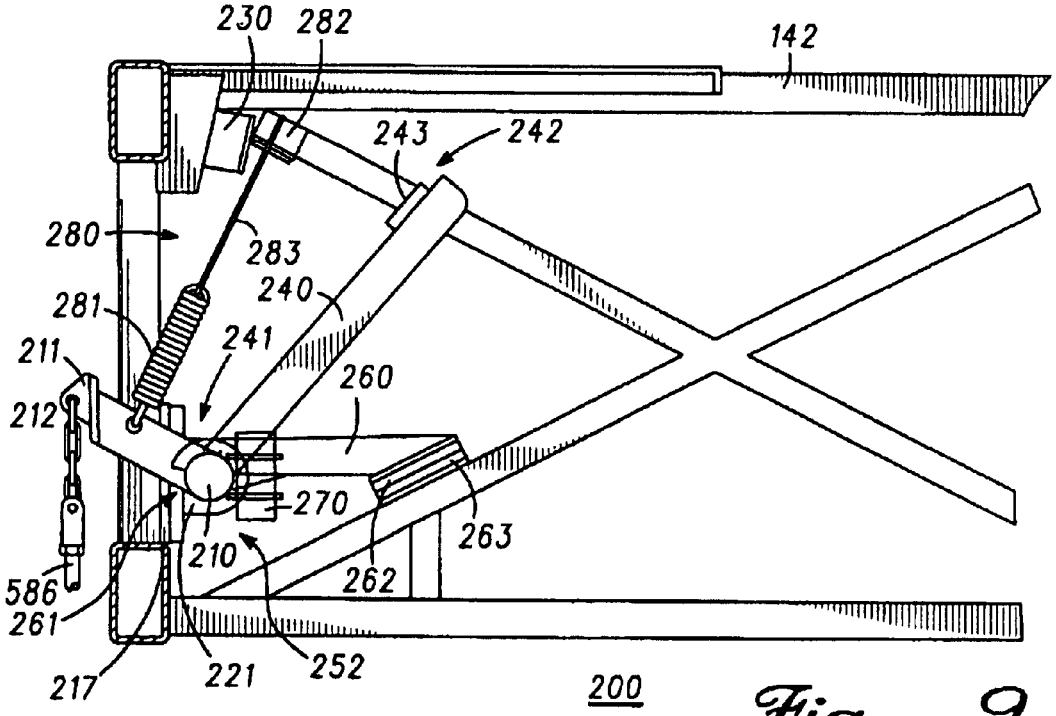
FIG. 9 is a side view of a portion of the door release module of the staring gate of FIG. 1, wherein the door release module is in an uncocked position.
Figure 10:
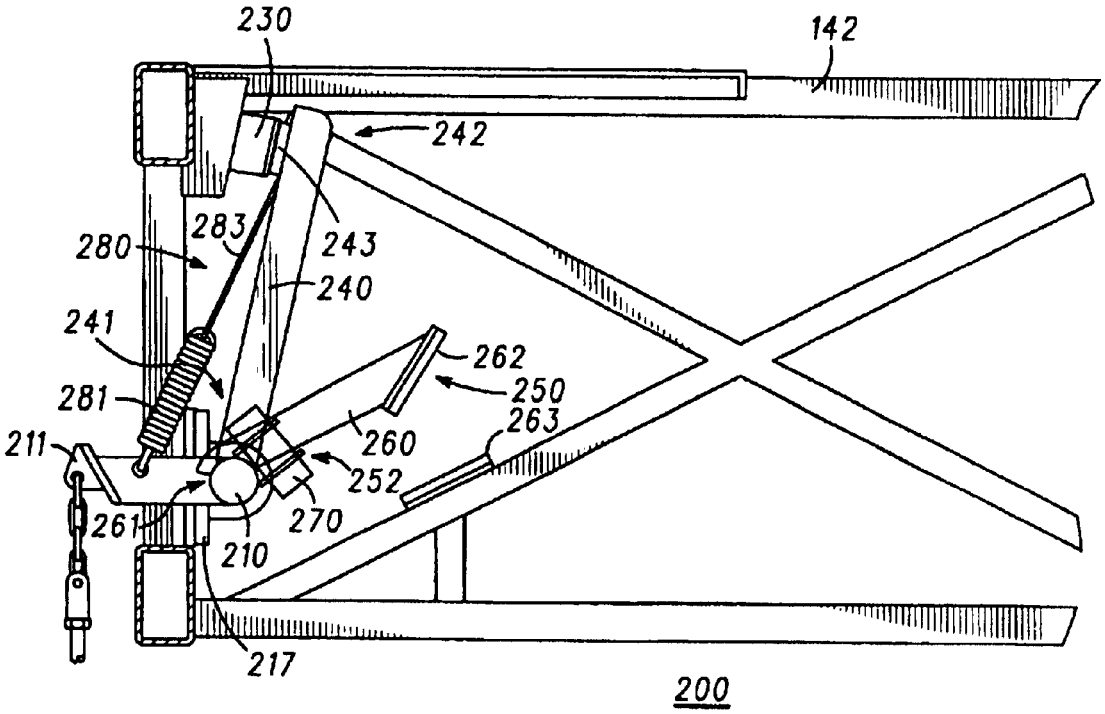
FIG. 10 is a side view of a portion of the door release module of FIG. 9, wherein the door release module is in a cocked position.

Referring to FIGS. 8–10 together, door release module 200 is shown coupled to truss module 100. As taught with reference to FIG. 1, door release module 200 comprises roll-bar 210 having gating arms 211, bearing mounting plate 217, bearings 221, a door latch actuator 230, a rotation bar 240 having a magnetic release plate 243 coupled thereto, a backward rotation stop 260, a swivel plate 270, and a spring mechanism 280. It should be understood that roll-bar 210 is an articulated member whose number of members or gating arms is preferably equal to the number of stalls. Hence, for a six stall starting gate there are six gating arms, for an eight stall staring gate there are eight arms, for a ten stall staring gate there are ten arms, for a twelve stall starting gate there are twelve arms, etc.

Roll-bar 210 is comprised of two pipes 225 and 226 connected by a U-joint 227. Preferably, pipes 225 and 226 are cylindrically shaped. Roll-bar 210 is coupled to interior vertical braces 121–129 via bearings 221 mounted to bearing mounting plates 217. Preferably, roll-bar 210 is designed such that is does not span more than two bearings without a U-joint and it does not span more than two stalls without a bearing. An advantage of building roll-bar 210 in sections connected by U-joints and mounting them to truss 110 using bearings located at predetermined locations is that it provides flexibility to the roll-bar when truss module 100 bends under the weight of the stalls. In other words, as trusses 110 and 140 bend, the U-joints cooperate with the bearings to provide flexibility to the roll-bar thereby preventing it from binding *as occurs in prior art gates*. Roll-bar 210 also include gating arms 211 extending therefrom.

Referring now to FIG. 9, a side view of door release mechanism 200 in an uncocked position is shown. When in an uncocked position, front doors 502 and 503 are open and the roll bar is not held by door latch actuator 230. By way of example, door latch actuator 230 includes a magnet. Preferably, magnet 230 is an electrically energized rare earth magnet that is coupled to the portion of upper rail 112 between interior braces 124 and 125. It should be understood that the location of magnet 230 is not a limitation of the present invention. Rotation bar 240 is coupled to roll-bar 210 and is preferably a tapered quadrilateral structure having a coupling end 241 and a mounting end 242, where coupling end 241 is wider than mounting end 242 and is coupled to roll-bar 210. It should be noted that the tapered aspects of rotation bar 240 are more clearly illustrated with reference to FIG. 8. Magnetic release plate 243 is capable of being attracted by magnet 230 and is attached or mounted to mounting end 242. An advantage of configuring and mounting rotation bar 240 as shown and described with reference to FIGS. 8–10 is that the moment arm of the magnet is increased, thereby increasing the rotational force applied to roll-bar 210 when it is being cocked. In other words, the configuration of the present invention makes cocking the door release mechanism easier.

Door release module 200 also has a rotation stop 260 having a coupling end 261 and a contact pad 262. Contact pad 262 contacts stopping or rotation stop pad 263 when magnet 230 has been de-energized to prevent roll-bar 210 from over-rotating and becoming damaged. Optionally, rotational stop 260 is coupled to roll-bar 210 via a swivel plate 270. In accordance with the first embodiment, door release module 200 comprises a magnet 230 and rotation stop 260. Alternatively, door latch actuator 230 comprises a solenoid (not shown).

Further, door release module 200 includes a spring mechanism 280 having a spring 281 coupled to a clamp 282 via a cable 282. Clamp 282 is mounted to diagonal cross brace 142. Spring mechanism 280 pulls arm 211 up when magnet 230 is de-energized thereby opening the individual doors. To cock roll-bar 210, a pipe is inserted into swivel plate 270 and roll-bar 210 is rotated until magnet 230 holds (or until the latch engages when a solenoid is used instead of a magnet). It should be understood that there can be a spring mechanism associated with each gating arm 211; however, the number of spring mechanisms is determined by the difficulty of roll-bar 210 opening front doors 502 and 503, i.e., each gating arm has a provision for a spring mechanism but each gating arm may not have a spring mechanism.

Gating arm 211 is coupled to coupling bar 586 by means of a chain 212. Alternatively, a cable or similar flexible fastener could be used to couple gating arm 211 to coupling bar 586. An advantage of using chain 212 is that it provides flexibility when gating arm 211 is moved. It should be noted that coupling bar 586 is shown and described with reference to FIG. 4.

Referring now to FIG. 10, a side view of front door release module 200 in a cocked position is shown. When in a cocked position, front doors 502 and 503 are shut and the roll bar is held by door latch actuator 230, e.g., a magnet or a solenoid. In this configuration, magnet 230 is energized, mounting plate 243 is attracted by magnet 230, and front doors 502 and 503 are opened.

Similar to truss module 100, stall divider module 300, front door module 500, and back door module 600, the dimensions of each component of door release module 200 are held to within very tight tolerances.

Referring again to FIG. 1 and in accordance with an embodiment of the present invention, towing module 700 comprises an axle assembly 710 having a set of wheels 712 mounted thereto. Axle assembly 710 is welded to a towing platform 714. One end of a support column 716 is welded to an end of truss 110 and an opposing end of support column 716 is welded to towing platform 714. One end of another support column 716 is welded to an end of truss 140 and an opposing end of support column 716 is welded to towing platform 714. A set of braces 718 are welded between support columns 716 and towing platform 714.

Figure 11:
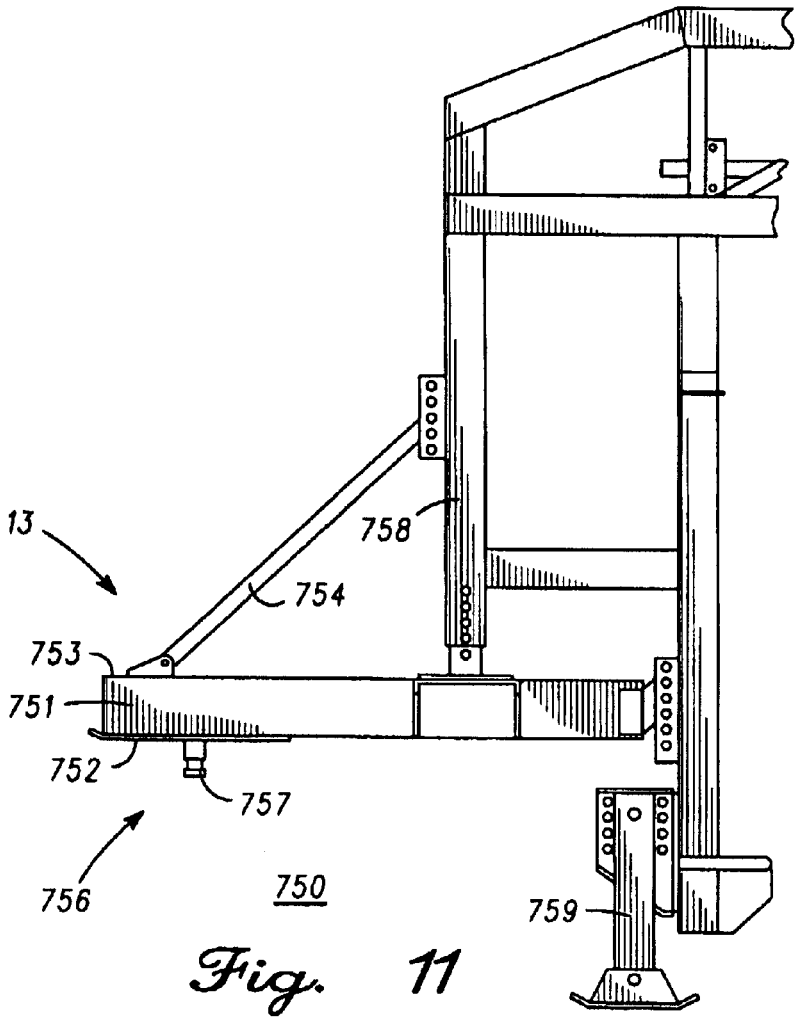
FIG. 11 is a side view of a front transport module of the starting gate of FIG. 1.

Referring to FIGS. 1 and 11 together, another embodiment of a towing module 700 is illustrated, wherein axle assembly 710 and towing platform 714 are replaced by a fifth wheel transport module 750, i.e., fifth wheel transport module 750 for coupling to towing end 13. FIG. 11 is a side view of a fifth wheel assembly 750 coupled to towing end 13. Fifth wheel assembly 750 comprises a towing coupler 715 having a coupling side 752 and a top side 753. Diagonal braces 754 are connected from top side 753 to a vertical support 758. It should be understood that because FIG. 11 is a side view, only a single diagonal brace 754 and a single vertical support 758 are shown. An upper coupler 756 having a kingpin 757 is mounted to coupling side 752. Upper coupler 756 and kingpin 757 are adapted to mate with a lower coupler (not shown) that is typically mounted to a towing vehicle such as, for example, a truck. In accordance with one embodiment of the present invention, a pair of retractable vertical supports 759 is coupled to fifth wheel assembly 750. Retractable vertical supports 759 allow for uncoupling the towing vehicle from staring gate 10 as well as provide a means for leveling starting gate 10. Further, an optional towing dolly (not shown) may be mounted to fifth wheel assembly 750, wherein the towing dolly cooperates with upper coupler 756 for towing starting gate 10. Because fifth wheel assembly 750 is manufactured in a modular fashion, it is important to ensure that it will properly mate with the other parts of starting gate 10. Thus, fifth wheel assembly 750 is manufactured using a wheel fixture (not shown) that emulates a tow dolly or other towing vehicle.

Referring again to FIG. 1, wheel module 800 comprises an axle assembly 810, wherein a set of wheels 812 are mounted to an axle 813. Axle assembly 810 is welded to a platform 814. One end of a first support column 818 is welded to an end of truss 110 and an opposing end of support column 818 is welded to platform 814. One end of a second support column 818 is welded to an end of truss 140 and an opposing end of support column 818 is welded to towing platform 814. For the sake of completeness, FIG. 1 illustrates boxes 820 mounted to platform 814, which can be used for storing tools, batteries, spare parts, and other components useful for operating and maintaining starting gate 10.

Similar to truss module 100, door release module 200, stall divider module 300, front door module 500, and back door module 600, the dimensions of each component of transport modules 700 and 800 are held to within very tight tolerances.

Figure 12:
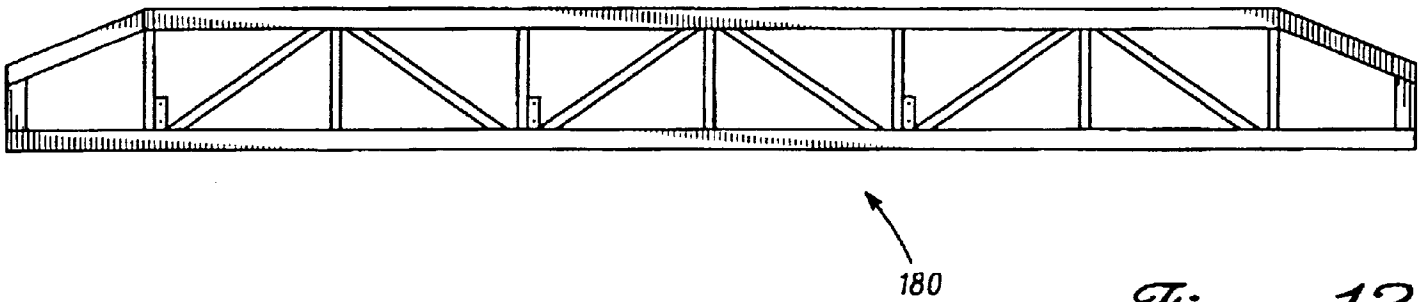
FIG. 12 illustrates a side view of a truss for use in accordance with another embodiment of a starting gate.
Figure 13:
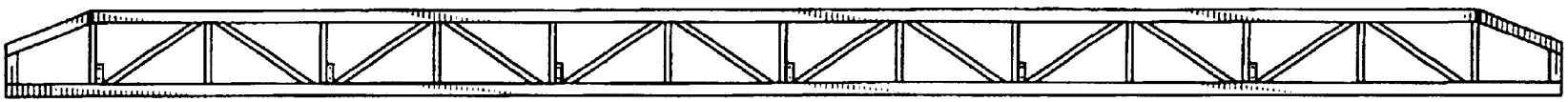
FIG. 13 illustrates a side view of a truss for use in accordance with yet another embodiment of a starting gate.

FIGS. 12 and 13 are included to further illustrate the modularity and the flexibility of starting gates of the present invention. FIG. 12 illustrates a side view of a truss 180 and FIG. 13 illustrates a side view of a truss 190 for use in a six stall staring gate configuration and a twelve stall starting gate configuration, respectively. The configurations of trusses 180 and 190 are similar to those of the eight stall truss, i.e., trusses 100 and 140, described with reference to FIGS. 1 and 2, except they are of a length suitable for the desired number of stalls. Starting gates are typically manufactured to have three to six stalls for schooling or training gates and up to twenty stalls for racing gates. It should be understood that the number of stalls of starting gate 10 is not a limitation of the present invention, i.e., starting gate 10 can have more or fewer than ten starting gates.

Padding is added to starting gate 10. Padding is particularly important to have on the insides of the stall including the inside of the front door, the inside of the rear door, the walls of the stall, the support columns and the bottom surfaces of the trusses. Padding helps to protect the horse, the jockey, and any ground men from injury should an accident occur.

By now it should be appreciated that a starting gate has been provided. In accordance with the present invention, the starting ate comprises a door release module, a stall divider module, a front gate module, a rear gate module, a towing module, and a wheel module coupled to a truss module. Each module is manufactured to be within very tight specifications and these specifications can be maintained when the modules are assembled into the final starting gate structure. The components of the staring gates can be painted after they've been assembled as modules rather than after the starting gate has been manufactured. The paint can be further protected by using plastic washers and plastic tape in areas where friction may cause the paint to wear, e.g., in the pivot arm region. The present invention also enables interchangeability between the towing module and the wheel module as well as interchangeability between different starting gates. This feature gives horse track owners flexibility in the direction they can move the starting gate from the track. Further, the present invention allows towing the starting gate at highway speeds. Another aspect of interchangeability is that the front and back doors are removable and can be easily replaced in the event that one becomes damaged without damaging the starting gate. For example, back doors of the present invention can be quickly replaced by another back door by removing the damaged door and replacing it with an undamaged door (unlike previous starting gates which required cutting the starting gate to remove the back door). Because of the tight tolerances and the uniformity of each starting gate, they have a distinctive look that provides an advertising advantage.

Although certain preferred embodiments and methods have been disclosed herein, it will be apparent from this foregoing disclosure to those skilled in the art that variations and modifications of such embodiments and methods may be made without departing from the spirit and scope of the invention.

What is claimed is:

[1. A horse race starting gate, comprising:

a truss module, the truss module positioned in a first orientation;

a door release module coupled to the truss module;

a stall divider module coupled to the truss module;

a front door coupled to the stall divider module; and a rebound stop having a first portion coupled to the front door and a second portion coupled to the stall divider module, the first portion having a first member for frictionally engaging the second portion.]

[2. The horse race starting gate of claim 1, wherein the first portion of the rebound stop is an L-shaped structure.]

[3. The horse race starting gate of claim 2, wherein L-shaped structure has a plate that is substantially perpendicular to the direction of gravity.]

[4. The horse race starting gate of claim 1, wherein the first portion includes adjustment slots for adjusting the first portion in a vertical direction.]

[5. The horse race starting gate of claim 1, wherein the second portion comprises a coupling plate coupled to an adjustable plate.]

[6. The horse race starting gate of claim 5, wherein the second portion further comprises a spring loaded bolt, the spring loaded bolt for adjusting a space between the coupling plate and the adjustable plate.]

[7. The horse race starting gate of claim 6, wherein the coupling plate further comprises an angled plate, and wherein the horse race starting gate further includes means for dampening vibration coupled to the angled plate.]

[8. The horse race starting gate of claim 1, wherein the door release module comprises a roll-bar coupled to the truss structure, the roll-bar having articulated members extending therefrom.]

[9. The horse race starting gate of claim 8, wherein the door release module further comprises means for rotating the roll-bar.]

[10. The horse race starting gate of claim 9, the means for rotating the roll-bar comprises one of a solenoid and a magnet.]

[11. The horse race starting gate of claim 1, wherein the door release module comprises a pivot arm coupled to the articulated member via a coupling bar having a turnbuckle adjuster coupled thereto.]

[12. The horse race starting gate of claim 1, further including a transport module coupled to the truss module.]

[13. A starting gate, comprising:

a horse stall having first and second sides;

a door coupled to the first side of the horse stall; and means for actuating the door, wherein said means for actuating includes a roll-bar coupled to the horse stall via a plurality of bearings, said roll-bar comprising:

a first section coupled to a second section by a U-joint, wherein said roll-bar spans at most two bearings without a U-joint;

means for rotating the roll-bar coupled to the horse stall;

an articulated member extending from the roll-bar; and coupling bar coupled to the articulated member.]

[14. The starting gate of claim 13, further including a turnbuckle adjuster coupled to the coupling bar.]

[15. The starting gate of claim 13, wherein the means for rotating the roll-bar comprises one of a magnet and a solenoid.]

[16. The starting gate of claim 13, wherein the horse stall comprises a plurality of horse stalls and wherein the roll-bar spans at most two stalls without a bearing.]

[17. The starting gate of claim 13, further including a door coupled to the second side of the stall divider.]

[18. The starting gate of claim 13, further including a rebound stop having a first portion coupled to the door coupled to the first side of the starting gate and a second portion coupled to the stall divider module, the first portion having a first member for fictionally engaging the second portion, wherein the first portion is an L-shaped structure having a plate substantially perpendicular to the direction of gravity and a plate having adjustment slots and the second portion comprises a coupling plate coupled to an adjustable plate via a spring loaded bolt.]

[19. A starting gate, comprising:

an overhead support structure;

first and second stall dividers coupled to the overhead support structure, the first and second stall dividers having first and second ends, wherein the first ends of the first and second stall dividers are adjacent each other and the second ends of the first and second stall dividers are adjacent each other;

a first set of doors coupled to the first ends of the first and second stall divider;

a second set of doors coupled to the second ends of the first and second stall dividers;

a door release mechanism coupled to the overhead support structure, the door release mechanism comprising:

a roll-bar having a first section coupled to a second section by a U-joint, wherein said roll-bar spans at most two bearings without a U-joint;

means for rotating the roll-bar coupled to the horse stall;

a plurality of articulated members extending from the roll-bar; and a coupling bar coupled to each of the plurality of articulated members wherein a first coupling bar is coupled to a first door of the first set of doors and a second coupling bar is coupled to a second door of the first set of doors; and first and second rebound stops coupled to the first and second doors, respectively.]

[20. The starting gate of claim 19, wherein the first and second rebound stops comprise a first portion coupled to the respective first and second doors and a second portion coupled to the stall divider, the first portion having a first member for frictionally engaging the second portion, wherein the first portion is an L-shaped structure having a plate substantially perpendicular to the direction of gravity and the plate having adjustment slots and the second portion comprises a coupling plate coupled to an adjustable plate via a spring loaded bolt.]

*21. A horse race starting gate, comprising:*

*a plurality of stall divider modules, plural of said plurality of stall divider modules comprising at least a front support column, a back support column and a plurality of lengthwise braces welded together as a unit prior to welding said stall divider module to a truss module;*

*a truss module having a plurality of said stall divider modules welded thereto;*

*a door release module coupled to the truss module;*

*a front door coupled to the stall divider module; and*

*a rebound stop having a first portion coupled to the front door and a second portion coupled to the stall divider module, the first portion having a first member for frictionally engaging the second portion.*

*22. The horse race starting gate of claim 21, wherein the stall divider module further comprises a caboose, a front fender and a rear fender and wherein said caboose, said front fender, said rear fender, said front support column, said back support column and said plurality of lengthwise braces are welded together as a module prior to welding said stall divider module to a truss module.*

*23. The horse race starting gate of claim 22, wherein the stall divider module further comprises a plurality of door hinges, and wherein said caboose, said front fender, said rear fender, said front support column, said back support column, said plurality of lengthwise braces and said plurality of door hinges are welded together as a module prior to welding said stall divider module to a truss module.*

*24. The horse race starting gate of claim 21, wherein the door release module comprises a roll-bar supported by a plurality of bearings, said roll bar comprising at least two roll bar sections joined by a U-joint, wherein the roll bar spans at most two bearings without a U-joint.*

*25. The horse race starting gate of claim 24, wherein the door release module further comprises means for rotating the roll-bar.*

*26. The horse race starting gate of claim 25, wherein:*

*the means for rotating the roll-bar comprises one of a solenoid and a magnet.*

*27. The horse race starting gate of claim 21, wherein:*

*the first portion of the rebound stop is vertically adjustable by means of vertical slots operatively disposed between said first portion and said front door.*

*28. A starting gate, comprising:*

*a horse stall having first and second sides;*

*a door coupled to the first side of the horse stall;*

*a door latch; and*

*means for actuating the door, wherein said means for actuating includes a roll-bar coupled to the horse stall via a plurality of bearings, said roll-bar comprising:*

*a first shaft section coupled to a second shaft section by a U-joint, wherein said first shaft section spans no more than two bearings without a U-joint;*

*means for rotating the roll-bar coupled to the horse stall;*

*an arm extending from the roll-bar; and*

*a coupling bar coupled between said arm and said door latch for actuating said door latch.*

*29. The starting gate of claim 28, wherein said coupling bar comprises a turnbuckle adjuster.*

*30. The starting gate of claim 28, wherein the means for rotating the roll-bar comprises one of a magnet and a solenoid.*

*31. The starting gate of claim 28, wherein the starting gate comprises at least three shaft sections coupled together by a plurality of U-joints and wherein each of said at least three shaft sections spans no more than two bearings without a U-Joint.*

* * * * *